(12) United States Patent
Krogh (10) Patent No.: US 7,917,254 B2
(45) Date of Patent: Mar. 29, 2011

(54) AIRCRAFT GUIDANCE USING LOCALIZER CAPTURE CRITERIA FOR RECTILINEAR DISPLACEMENT DATA

(75) Inventor: Steven B. Krogh, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 347 days.

(21) Appl. No.: 11/848,127

(22) Filed: Aug. 30, 2007

(65) Prior Publication Data

US 2008/0294307 A1 Nov. 27, 2008

Related U.S. Application Data

(63) Continuation-in-part of application No. 11/752,038, filed on May 22, 2007.

(51) Int. Cl.
*G05D 1/08* (2006.01)
(52) U.S. Cl. ......... 701/7; 701/3; 701/8; 701/16; 701/17; 244/158.1; 244/181
(58) Field of Classification Search .................. 701/3, 7, 701/15, 16, 8, 17; 244/158.1, 181, 183
See application file for complete search history.

(56) References Cited

U.S. PATENT DOCUMENTS

| | | | |
|---|---|---|---|
| 6,438,469 B1 * | 8/2002 | Dwyer et al. ............... | 701/16 |
| 6,604,044 B1 * | 8/2003 | Kirk .......................... | 701/120 |
| 6,950,037 B1 | 9/2005 | Clavier et al. | |
| 6,952,632 B2 | 10/2005 | Robert et al. | |
| 7,522,977 B2 | 4/2009 | Foucart et al. | |
| 2005/0004723 A1 | 1/2005 | Duggan et al. | |
| 2005/0033489 A1 | 2/2005 | Tezuka | |
| 2007/0129855 A1 * | 6/2007 | Coulmeau ................... | 701/3 |

FOREIGN PATENT DOCUMENTS

| | | |
|---|---|---|
| EP | 1014104 A2 | 6/2000 |
| FR | 2872316 A1 | 12/2005 |
| FR | 2884022 A1 | 10/2006 |
| WO | WO9818016 A1 | 4/1998 |

OTHER PUBLICATIONS

Braden, et al., "Integrated Inertial Navigation System/Global Positioning System (INS/GPS) for Manned Return Vehicle Autoland Application", IEEE Plans '90, Mar. 1990, pp. 74-82.

* cited by examiner

*Primary Examiner* — Gertrude Arthur Jeanglaud
(74) *Attorney, Agent, or Firm* — Lee & Hayes, PLLC (57) ABSTRACT

Systems and methods for aircraft guidance using a localizer capture criteria for rectilinear displacement data are disclosed. In one embodiment, the method includes determining a rectilinear deviation D between a current aircraft location and a final defined path (FDP) of an aircraft and determining a location at which the aircraft should begin a reposition maneuver based on the rectilinear deviation D. The method starts a reposition maneuver of the aircraft at a location determined based on a relationship between D and characteristics of the aircraft during the reposition maneuver. In some embodiments, the characteristics of the aircraft may include a velocity of the aircraft with respect to ground, an aircraft track angle, a heading of the FDP of the aircraft, a maximum allowed bank angle of the aircraft during a reposition maneuver, and a time allowance for aircraft rollup and rollout.

19 Claims, 5 Drawing Sheets

AIRCRAFT GUIDANCE USING LOCALIZER CAPTURE CRITERIA FOR RECTILINEAR DISPLACEMENT DATA

RELATED APPLICATIONS

This application is a continuation in part of U.S. patent application Ser. No. 11/752,038, filed May 22, 2007, the entire content of which is hereby incorporated by reference.

FIELD OF THE INVENTION

This invention relates to systems and methods for runway approach guidance of aircraft, to systems and methods for performing Global Positioning systems, Integrated approach navigation system (IAN), Microwave landing system (MLS), lateral navigation system (LNAV), and Instrument Landing System (ILS) localizer reposition maneuvers and more specifically, to a criteria for using rectilinear displacement data to determine the location at which an aircraft should make its approach to a final destination path.

BACKGROUND OF THE INVENTION

Generally speaking, Instrument Landing Systems (ILS) are widely used in the aviation industry to provide guidance to aircraft. Specifically, ILS are often used to provide approach guidance to an aircraft for landing. The system usually consists of transmitters and antenna arrays on the ground, antennas and receivers on the aircraft, and a display for the flight crew. Autopilots and flight directors may also actively participate in the system.

A localizer component of the ILS may provide lateral guidance beams, while vertical guidance beams may be provided by a glide slope component of the ILS system. Both components provide the aircraft with an indication of its separation from the desired approach path, in the form of an angular error.

An aircraft preparing to perform a landing approach may fly a flight path which intersects the localizer. Typically, when an aircraft reaches the linear part of the localizer beam, (the course guidance sector), it executes a localizer reposition maneuver to reposition the desired approach path (the null of the localizer). In most instances, the localizer null may be configured to align with a runway centerline. Alternatively, the localizer null may be configured to indicate a particular point in space from which a flight crew may maneuver the aircraft to a corresponding runway.

Accordingly, after a successful reposition maneuver, the aircraft's flight path will generally be in line with the runway centerline or aligned with the particular point in space. Ideally, the aircraft on approach performs a single turn to reposition the localizer null, and will not fly through the null (overshoot) prior to completing its turn.

Although desirable results have been achieved using such prior art systems, there may be room for improvement. For example, localizer overshoots may occur due to the fact that the segment of the localizer beam which reliably provides an accurate indication of aircraft displacement is relatively narrow. This segment, commonly known as the course guidance sector, may be only approximately +/−2 degrees of arc about the localizer null. As a result, if an aircraft does not begin its reposition maneuver until it encounters this sector, it may have only a small distance in which to complete its turn in order to avoid an overshoot.

Additionally, an overshoot may be exacerbated if the aircraft is intercepting the localizer with a large intercept angle, a high ground speed, or is close to the airfield (where the angular beam width corresponds to a smaller physical distance). Localizer repositions with a significant overshoot may waste fuel, may cause discomfort for aircraft passengers, and may make it necessary for air traffic control to widely space incoming aircraft at airfields with parallel runways. Also turning the aircraft to early may delay the eventual capture of the desired path and result in an undesired over flight of obstacles or protected airspace. Therefore, novel systems and methods which reduce or eliminate overshoots during localizer reposition maneuvers would have utility.

SUMMARY

The present disclosure is directed to systems and methods for providing consistent localizer repositions, including consistent localizer captures. More specifically, embodiments of systems and methods in accordance with the present disclosure may advantageously reduce or eliminate overshoots during localizer reposition maneuvers by allowing an aircraft to begin reposition maneuvers prior to reaching the course guidance sector. Such embodiments may also advantageously enable the performance of localizer reposition maneuvers at larger intercept angles. In this way, airlines may realize fuel and time savings as localizer overshoots are reduced. Moreover, congestion at airports may be relieved as reductions in the overshoots may allow aircraft to be sequenced more closely together during landing approaches.

In one implementation, a method for determining a location at which an aircraft should begin a reposition maneuver includes determining a rectilinear deviation D between a current aircraft location and a final defined path (FDP) of the aircraft, and starting a reposition maneuver of the aircraft at the location determined based on a relationship between D and characteristics of the aircraft during the reposition maneuver. In some embodiments, the characteristics of the aircraft during the reposition maneuver are selected from the group of characteristics comprising: a velocity of the aircraft with respect to ground (Vel_Gnd), an aircraft track angle, a heading of the FDP of the aircraft, a maximum allowed bank angle of the aircraft during a reposition maneuver (Phimax), and a time allowance for aircraft rollup and rollout (Capt_Rup_KPg).

In another implementation, a method for determining a location at which an aircraft should begin a reposition maneuver includes determining a velocity of the aircraft with respect to ground (Vel_Ground) and determining the aircraft's track angle and heading of an aircraft Final Defined Path (FDP). A cosine of (the determined aircraft track angle minus the determined FDP heading) (Rwy_Trk_Dif_Cos) and a sine of (the determined aircraft track angle minus the determined aircraft FDP heading) (Rwy_Trk_Dif_Sin) is computed along with a maximum allowed bank angle of the aircraft during a reposition maneuver (Phimax). A time allowance for aircraft rollup and rollout (Capt_Rup_KPg) along with a rectilinear deviation D between a current aircraft location and the FDP of the aircraft is determined. A reposition maneuver of the aircraft is then started based on a relationship between rectilinear deviation D and the D1+D2, where D1=(Vel_Gnd)$^2$*(1−Rwy_Trk_Dif_Cos)/(G*tan (Phimax)) and D2=Vel_Gnd*Capt_Rup_KPg*Rwy_Trk_Dif_Sin, and where G is the universal gravitational acceleration constant.

In another implementation, an aircraft is provided that includes a structural assembly and at least one avionic system for guiding aircraft that is at least partially disposed within the aircraft fuselage. The avionic system includes an instrument landing system (ILS) component configured to receive a velocity of an aircraft with respect to ground (Vel_Ground), an aircraft track angle, a heading of a final approach course or FDP for the aircraft, a maximum allowed bank angle of the aircraft during a reposition maneuver (Phimax), a current location of the aircraft and a time allowance for aircraft rollup and rollout (Capt_Rup_KPg). The avionic system accesses a flight management function (FMF) component in a capture maneuver computer configured to compute: a cosine of (the determined aircraft track angle minus the determined FDP heading) (Rwy_Trk_Dif_Cos), a sine of (the determined aircraft track angle minus the determined aircraft FDP heading) (Rwy_Trk_Dif_Sin), and a rectilinear deviation D between the current aircraft location and the FDP of the aircraft. A reposition maneuver component is included in the system and configured to perform a reposition maneuver at a location determined based on a relationship between rectilinear deviation D and the D1+D2, where D1=(Vel_Gnd)$^2$*(1−Rwy_Trk_Dif_Cos)/(G*tan (Phimax)) and D2=Vel_Gnd*Capt_Rup_KPg*Rwy_Trk_Dif_Sin, and where G is the universal gravitational acceleration constant.

While specific embodiments of the invention have been illustrated and described herein, as noted above, many changes can be made without departing from the spirit and scope of the invention. Accordingly, the scope of the invention should not be limited by the disclosure of the specific embodiments set forth above. Instead, the invention should be determined entirely by reference to the claims that follow.

BRIEF DESCRIPTION OF THE DRAWINGS

Embodiments of systems and methods in accordance with the teachings of the present disclosure are described in detail below with reference to the following drawings.

DETAILED DESCRIPTION

Embodiments of systems and methods in accordance with the present disclosure are directed to aircraft performance localizer reposition maneuvers. Many specific details of certain embodiments of the invention are set forth in the following description and in FIGS. 1-5 to provide a thorough understanding of such embodiments. The present invention may have additional embodiments, or may be practiced without one or more of the details described below.

Generally, embodiments of systems and methods in accordance with the present disclosure may advantageously reduce or eliminate overshoots during localizer reposition maneuvers. Such embodiments may also advantageously enable the performance of localizer reposition maneuvers at larger intercept angles, which may result in fuel and time savings, as well as relieve air traffic congestion at airports.

Figure 1:
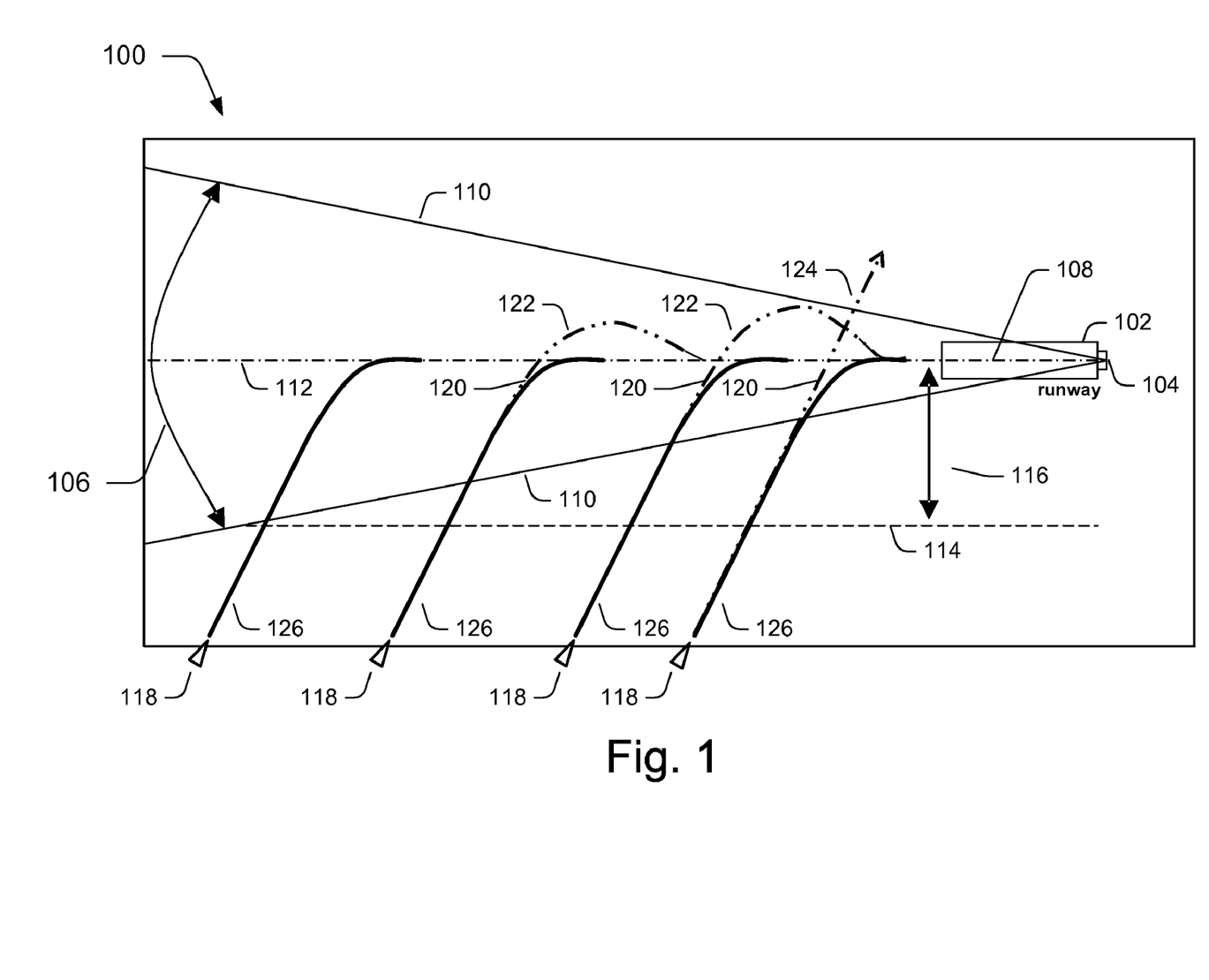
FIG. 1 is an aerial view depicting an exemplary concept for performing reposition maneuvers, including standard and modified track-to-localizer reposition maneuvers, in accordance with an embodiment of the invention.

FIG. 1 is an aerial view depicting an exemplary concept 100 for performing consistent reposition maneuvers, including standard and modified track-to-localizer reposition maneuvers, in accordance with an embodiment of the invention. FIG. 1 illustrates a runway 102 equipped with an instrument landing system (ILS) that includes a localizer 104. In one embodiment, the localizer 104 may include a plurality of transmitters and antenna arrays (not shown). The localizer 104 includes an ILS course guidance sector 106. The guidance sector 106 also includes a localizer null 108. Physical offset from the null, which describes the horizontal operational perimeters of the ILS, may be depicted by ILS boundaries 110. Typically, the ILS course guidance sector 106 may be visualized as an area defined by an arc emanating from the localizer 104 and enclosed by the ILS boundaries 110.

FIG. 1 also illustrates a desired or final approach course (FAC) 112. Generally speaking, a final approach course is a flight path that enables an aircraft to approach and land on a runway. A FAC, also referred to herein as a Final Defined Path (FDP) may also be any desired course of the aircraft after making a turn maneuver. As shown, the final approach course 112 is flanked by an FAC deviation threshold 114. The FAC deviation threshold 114 represents a predetermined distance 116 from the final approach course. Although only one FAC deviation threshold 114 is shown in FIG. 1, it will be appreciated that in alternative embodiments, FAC deviation thresholds 114 may be present along both longitudinal sides of final approach course 112. As shown in FIG. 1, the FAC deviation thresholds 114 may be placed farther away from runway 102 than the ILS boundaries 110 at least along some portions of their length.

In most instances, standard localizer reposition maneuvers 120 may be initiated when an aircraft 118 approximates the course guidance sector 106. In other words, standard localizer reposition maneuvers 120 may be initiated when an aircraft is in close proximity to or reaches the course guidance sector 106. In most instances, a standard localizer reposition maneuver 120 is initiated when an aircraft 118 reaches the course guidance section because the aircraft generally has to rely on ILS signals present in the course guidance sector 106. However, in some instances, the aircraft 118 may compare inertia data with ILS signals outside the course guidance sector 106. This comparison may enable aircraft 118 to begin a standard localizer reposition maneuver 120 in proximity of but prior to reaching the course guidance sector 106. In other implementations, localizer reposition maneuvers 120 may be initiated when the aircraft's rectilinear deviation from the final flight path satisfy a predetermined criteria (See FIG. 5).

Regardless of the particular instance, the aircraft 118 in one implementation uses the ILS signals to determine what are known as ILS localizer errors, that is, angular deviations from the localizer null 108. Additionally, ILS localizer errors may also include estimated rectilinear deviations calculated from the angular deviations. The aircraft 118 may initiate a turn if these ILS localizer errors or the aircraft's rectilinear deviation from the final flight path satisfy certain predetermined criteria. Moreover, the ILS localizer errors also generally serve as feedback terms during the reposition maneuver, guiding the aircraft in making the necessary turn to line up with a runway, such as runway 102, or any desired point in space from which final landing may be performed. In some instances, ground track angle, ground speed and runway heading may also be used to determine when the aircraft 118 may initiate a standard localizer reposition maneuver 120. In other instances, ground speed, ground track angle, desired heading of the desired approach path, bank angle, time allowance for rollup and rollout, and the aircraft's rectilinear deviation from the final flight path may be used to initiate a localizer reposition maneuver 120.

However, as described above, the initialization of standard localizer reposition maneuvers 120 in the course guidance section 106 may result in overshoots 122, or failure to reposition 124. In contrast, modified reposition maneuvers 126, in accordance to various embodiments describe herein, turn the aircraft 118 into a shallow intercept angle prior to reaching the course guidance vector 106, thus facilitating any additional turns by the aircraft 118 in the course guidance sector 106. As a result, the performance of these modified reposition maneuvers may advantageously reduce or eliminate overshoots and failures to reposition that are associated with the standard localizer capture maneuvers or reposition maneuvers.

Figure 2:
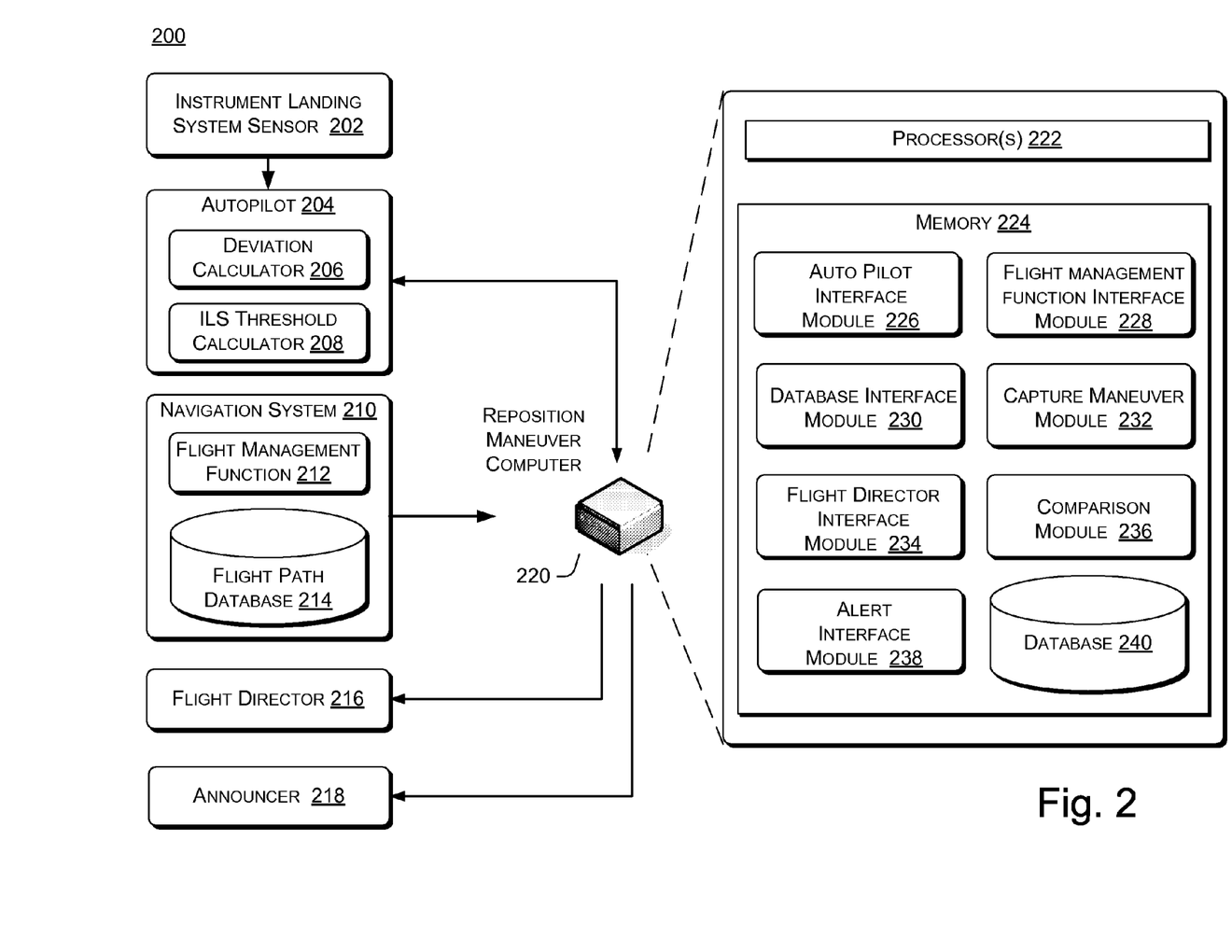
FIG. 2 is a block diagram depicting an exemplary avionics system in which methods for performing localizer reposition maneuvers, as shown in FIG. 1, may be implemented.

FIG. 2 is a block diagram depicting an exemplary avionic system 200 of an aircraft in which methods for performing localizer capture maneuvers may be implemented. The system 200 includes an instrument landing system (ILS) sensor 202, an autopilot 204 that includes a deviation calculator 206 and an ILS threshold calculator 208, a navigation system 210 that includes a flight management function 212 and an approach database 214, a flight director 216, an announcer 218, and an exemplary capture maneuver computer 220. In one embodiment, methods for performing localizer capture maneuvers in accordance with the teachings of the present disclosure may be implemented in the exemplary capture or reposition maneuver computer 220. The ILS sensor 202 may be configured to receive guidance signals from ground components, e.g., transmitters and antenna arrays, of an ILS via appropriate receivers. For each landing approach, the ILS sensor 202 may process these signals and acquire one or more angular separations of the aircraft from the localizer null 108 (FIG. 1) of the ILS.

The autopilot 204 is generally configured to pilot the aircraft without human intervention. In some embodiments, the autopilot 204 may be configured to receive the angular deviations during each landing approach or aircraft turn. The autopilot 204 may use the deviation calculator 206 to convert the angular deviations into estimated rectilinear deviations through the use of radio altitude, glide slope error, and estimated distances to the transmitters of the ILS or provided course direction. The autopilot 204 may be further configured to employ the ILS threshold calculator 208 to calculate one or more ILS thresholds. In one implementation, the one or more ILS thresholds may be calculated based on factors such as aircraft ground speed and intercept angle. However, it will be appreciated that in other implementations, additional factors may be used to calculate the ILS thresholds.

As described above, during aircraft landings using the ILS, either the angular deviation, or the estimated rectilinear deviations, collectively known as localizer errors, may be compared to predetermined ILS deviation criteria, e.g., the calculated ILS thresholds. It will be further appreciated that the deviation calculator 206 and the ILS threshold calculator 208 may be implemented as software algorithms or computer-executable instructions in the autopilot 204. However, in other instances, the deviation calculator 206 and the ILS threshold calculator 208 may also be implemented in one or more other avionic components that are capable of receiving, processing, and storing data The navigation system 210 may be used to provide the geographical position of the aircraft during flight. The navigation system 210 may include an Inertial Reference System (IRS), an Attitude Heading and Reference System (AHRS), a VOR or DME navigational aid, a Global Positioning System (GPS), a Global Satellite Landing system and the like. In various embodiments, the navigation system 210 may also include an onboard flight path database 214 that describes the final approach courses, final defined path, geographic coordinates and headings to one or more destinations, e.g., airport runways. Accordingly, the navigation system 210 may use the data contained in database 214 to guide the aircraft along a particular route to a destination runway. Moreover, the navigation system 210 may be further equipped with a flight management function (FMF) 212 that calculates FAC deviations from selected final approach courses. A FAC deviation is the shortest linear distance from an airborne aircraft to a final approach course or final defined path. In one embodiment, FMF is configured to receive: a velocity of an aircraft with respect to ground (Vel_Gnd), an aircraft track angle, a heading of a final defined path (FDP) for the aircraft, a maximum allowed bank angle of the aircraft during a reposition maneuver (Phimax), a current location of the aircraft and a time allowance for aircraft rollup and rollout (Capt_Rup_KPg)

The flight director 216 is generally configured to compute and display the proper path for the aircraft to one or more pilots during a specific flight. The flight director 216 may include a flight director indicator (FDI), a horizontal situation indicator (HSI), a mode selector, and a flight director computer. Moreover, the FDI may include a display that may present an attitude indicator, a fixed aircraft symbol, pitch and bank command bars, a glide slope indicator, a localizer deviation indicator, and the like. The flight director 216 may furnish a pilot with steering commands necessary to obtain and hold a desired path. As described below, the flight director 216 may be configured to provide steering commands necessary to perform reposition or course changing maneuvers.

Additionally, the exemplary avionics system 200 may also include an announcer 218. The announcer 218 may include a speaker, a buzzer, or other types of warning or noise-generating device. The announcer 218 may be activated by the exemplary avionics system 200 to provide audio warnings and messages to a flight crew. In one particular embodiment, the announcer 218 may be activated by the reposition maneuver computer 220.

As further shown in FIG. 2, the reposition maneuver computer 220 has processing capabilities and memory suitable to store and execute computer-executable instructions. In one embodiment, the reposition maneuver computer 220 includes one or more processors 222 and memory 224. The memory 224 may include volatile and nonvolatile memory, removable and non-removable media implemented in any method or technology for storage of information, such as computer-readable instructions, data structures, program modules or other data. Such memory includes, but is not limited to, random access memory (RAM), read-only memory (ROM), electrically erasable programmable read-only memory (EEPROM), flash memory or other memory technology, compact disc, read-only memory (CD-ROM), digital versatile disks (DVD) or other optical storage, magnetic cassettes, magnetic tape, magnetic disk storage or other magnetic storage devices, redundant array of independent disks (RAID) storage systems, or any other medium which can be used to store the desired information and which can be accessed by a computer system.

Modules which enable the capture or reposition maneuver computer 220 to perform various functions may be stored in the memory 224, including an autopilot interface module 226, a flight management function interface module 228, a database interface module 230, a reposition maneuver module 232, a flight director interface module 234, a comparison module 236, an alert interface module 236, and a database 240. These modules may be implemented as software or computer-executable instructions that are executed by the one or more processors 222 to perform the functions described below.

The autopilot interface module 226 is configured to communicate with the autopilot 204. The communication may be established over an electrical connection, an optical connection, and the like. In some embodiments, the autopilot interface module 226 may be configured to receive one or more angular deviations, or alternatively, estimated rectilinear deviations, from the autopilot 204. As described, the estimated rectilinear deviations may be calculated from the angular deviations received by the autopilot 204. In other embodiments, the autopilot interface module 226 may also be configured to enable the autopilot 204 to perform reposition or course changing maneuvers under the direction of the reposition maneuver computer 220, as describe below.

The flight management function interface module 228 is configured to communicate with the flight management function 212 of the navigation system 210. The communication may be established over an electrical connection, an optical connection, and the like. In some embodiments, the flight management function interface module 228 is configured to receive the calculated desired or final approach path deviations, that is, FAC deviations, from the flight management function 212.

The database interface module 230 enables the reading of data from and writing of data to the database 240. According to various embodiments, the database interface module 230 may be activated by the other modules in memory 224, as further described below. In some embodiments, the database 240 may contain information such as ILS criteria data (e.g., ILS thresholds) that are used to analyze the ILS localizer errors, FAC deviation criteria (e.g., FAC deviation thresholds), as well as other data that are necessary to initiate a standard reposition maneuver based on ground track angle, ground speed, and runway heading. For example, the ILS criteria data may include the plus or minus feet of specified estimated rectilinear deviations, and the FAC criteria data may include plus or minus feet of specified FAC deviations.

The reposition maneuver module 232 may be employed to command the autopilot 204 to automatically perform localizer reposition maneuvers. Alternatively, the reposition maneuver module 232 may be employed to provide information to the flight director 216. This information may enable a pilot to manually perform localizer reposition maneuvers. In some embodiments, the reposition maneuver module 232 may be configured to direct the performance of the standard localizer reposition s and the modified localizer reposition s.

The flight director interface module 234 may facilitate the communication between flight director 216 and the reposition maneuver module 232. Accordingly, the flight director interface module 234 may enable the flight director 216 to provide a pilot with the necessary steering commands to complete one of a standard reposition maneuver and a modified reposition maneuver.

The comparison module 236 may determine the timing and type of the localizer reposition maneuver performed by the aircraft. In one implementation, the comparison module 236 may be configured to receive the estimated rectilinear deviations from the autopilot interface module 226, as well as FAC deviations from the flight management function interface module 228. In another implementation, instead of the estimated rectilinear deviation, the comparison module may be configured to receive angular deviations from the autopilot interface module 226. Additionally, the comparison module 236 may retrieve the criteria from the criteria database 240 via the database interface module 230.

In some embodiments, the comparison module 236 may include a first algorithm that compares either the angular deviations or the estimated rectilinear deviations, i.e., ILS localizer errors with their corresponding criteria or thresholds to determine when to initiate localizer reposition maneuvers. Moreover, the comparison module 236 may include a second algorithm that simultaneously compares the FAC deviations with their corresponding criteria. If the ILS localizer errors are satisfied first, the comparison module 236 may command the reposition maneuver module 232 to direct the performance of a standard reposition maneuver. However, if the FAC deviation criteria are met first, the comparison module 236 may command the reposition maneuver module 232 to direct the performance of a modified reposition maneuver.

Typically, the angular deviations or estimated rectilinear deviation criteria may be satisfied when an aircraft 118 approximates the course guidance sector 106, as described above with reference to FIG. 1. Once the aircraft 118 nears the course guidance section 106, angular deviation or estimated rectilinear deviation may be used to perform the standard localizer reposition maneuver. In additional embodiments, aircraft ground track angles, ground speeds, and runway headings may also be used in conjunction with one of the angular deviations and estimated rectilinear deviations to perform the standard localizer reposition maneuver. In some embodiments, the performance of the standard reposition maneuver, as directed by the reposition maneuver module 232, generally aligns the aircraft heading with the centerline of a runway, thereby facilitating the landing of the aircraft 118. The performance of the standard reposition maneuver may be based on a standard localizer control law algorithm that is part of the reposition module 232.

On the other hand, the FAC deviation criteria may be satisfied when the aircraft 118 crosses the FAC deviation thresholds 114 established along the lengths of a runway. In some embodiments, the FAC deviation thresholds may be provided at a range of at least +/−24,000 feet from the runway. In particular embodiments, the range may be established to provide commonality with deviations used for global navigation satellite system (GNSS) landing systems, as per Aeronautical Radio Incorporated (ARINC) specification 755.

In some embodiments, the comparison module 236 may command the reposition maneuver module 232 to direct the performance of a modified reposition maneuver that includes at least two parts. The first part of the maneuver may turn the aircraft to a shallow intercept angle. In one particular embodiment, the shallow intercept angle may include angles in the range of approximately 30 to 40 degrees. This part may be referred to as a "track-to-localizer" mode. In some embodiments, the reposition maneuver module 232 may direct the performance of the "track-to-localizer" mode using an algorithm adapted from existing track selection control law algorithms implemented in other aircraft control systems. In some embodiments, "track-to-localizer" mode may, concurrent with turning the aircraft to a shallow intercept, also roll the aircraft to a predetermined bank angle. In one implementation, the bank angle may be approximately 30 degrees.

However, while the reposition maneuver module 232 is directing the performance of the "track-to-localizer" mode, the comparison module 236 may continuously monitor the angular deviations or the estimated rectilinear deviations, i.e., ILS localizer errors, from the autopilot 204. Once the ILS localizer errors reach their corresponding criteria, e.g., the aircraft reaches the ILS course guidance sector 106, the comparison module 236 may command the reposition maneuver module 232 to switch to perform at least a portion of the standard reposition maneuver. This subsequent reposition maneuver may be completed by the reposition or capture maneuver computer 220. In particular embodiments, the reposition maneuver module 232 may accomplish the switch by reverting to use the standard localizer reposition algorithm to perform the portion of the standard localizer reposition operation appropriate for completing the modified reposition maneuver.

The modified reposition maneuver may advantageously result in smaller overshoots when compared to overshoots resulting from standard reposition maneuvers 122 (with reference to FIG. 1). This is because the initial shallow reposition or capture angle directed by the "track-to-localizer" mode may facilitate the subsequent performance of the remaining portion of the standard reposition maneuver.

In some embodiments, the FAC deviations are subject to error if navigation solutions from the navigation system 210 are inaccurate. This may cause the comparison module 236 to command the reposition maneuver module 232 to prematurely initiate, or delay the initiation of the modified reposition maneuver. Accordingly, the comparison module 236 may be configured to direct the reposition maneuver module 232 to disable the "track-to-localizer" mode if there are indications that the navigation system 210 may be producing inaccurate FAC deviations. For example, some navigation systems may generate an estimate of actual navigation performance (ANP), which may be used to indicate navigation inaccuracies, and consequently, inaccurate FAC deviations.

Moreover, the use of shallow intercept angles in the "track-to-localizer" mode, particularly shallow intercept angles in the range of 30 to 40 degrees, may be advantageous because larger angles may be too steep to yield a small overshoot after the standard localizer algorithm takes over. Additionally, intercept angles in the range of approximately 30 to 40 degrees, may mitigate the risk of risk of failing to intercept the localizer at an acceptable distance from the runway, if errors in the FAC deviations cause the modified reposition maneuver to begin too soon. These risks may be especially prevalent when the intercept angle is less than 30 degrees.

In other embodiments, the comparison module 236 may command reposition maneuver module 232 to disable the "track-to-localizer" mode if the comparison module 236 determines that an aircraft is already at a shallow intercept angle to the runway at the time it cross the FAC deviation threshold 114. In one particular embodiment, the "track-to-localizer" mode may be disabled if the intercept angle is less than approximately 40 degrees. In additional embodiments, the "track-to-localizer" mode may be similarly disabled if the comparison module 236 determines that the aircraft is at steep intercept angle, such as an intercept angle that is greater than approximately 120 degrees.

The alert interface module 238 may be directed by the reposition maneuver module 232 to cause the announcer 218 to alert a flight crew that the "track-to-localizer" mode is active. In one implementation, the announcer interface module may cause the announcer 218 to inform the crew of the initialization and the termination of the "track-to-localizer" mode. In another implementation, the announcer 218 may be activated for the duration that the "track-to-localizer" mode is active. According to various embodiments, the alert interface module 238 may activate the announcer 218 to convey information by representative tones or human speech.

In additional embodiments, the reposition maneuver computer 220 may also use the alert interface module 238 to cause one or more cockpit display (not shown) to visually indicate that the "track-to-localizer" mode is active. For example, in one implementation, a primary flight display (PFD) may be activated by the reposition maneuver computer 220 to present symbols or characters during the activation of the "track-to-localizer" mode. In another implementation, one or more push button lights on the mode control panel (MCP) may illuminate during the "track-to-localizer" mode activation to provide visual alert.

It should be appreciated that the illustrated avionic environment 200 is only one example of a suitable operating environment and is not intended to suggest any limitation as to the scope of use or functionality of the invention. Other avionic environments and/or configurations may be suitable for use with the invention. For example, the exemplary reposition maneuver computer 220 may a part of a flight management computer (FMC). In other exemplary instances, one or more of the modules 226-238 may be directly implemented on the FMC, the autopilot 204, or any other suitable avionic component of a flight management system (FMS), navigation system, or any avionic system present in an aircraft that is capable of receiving, processing, and storing data.

Figure 3:
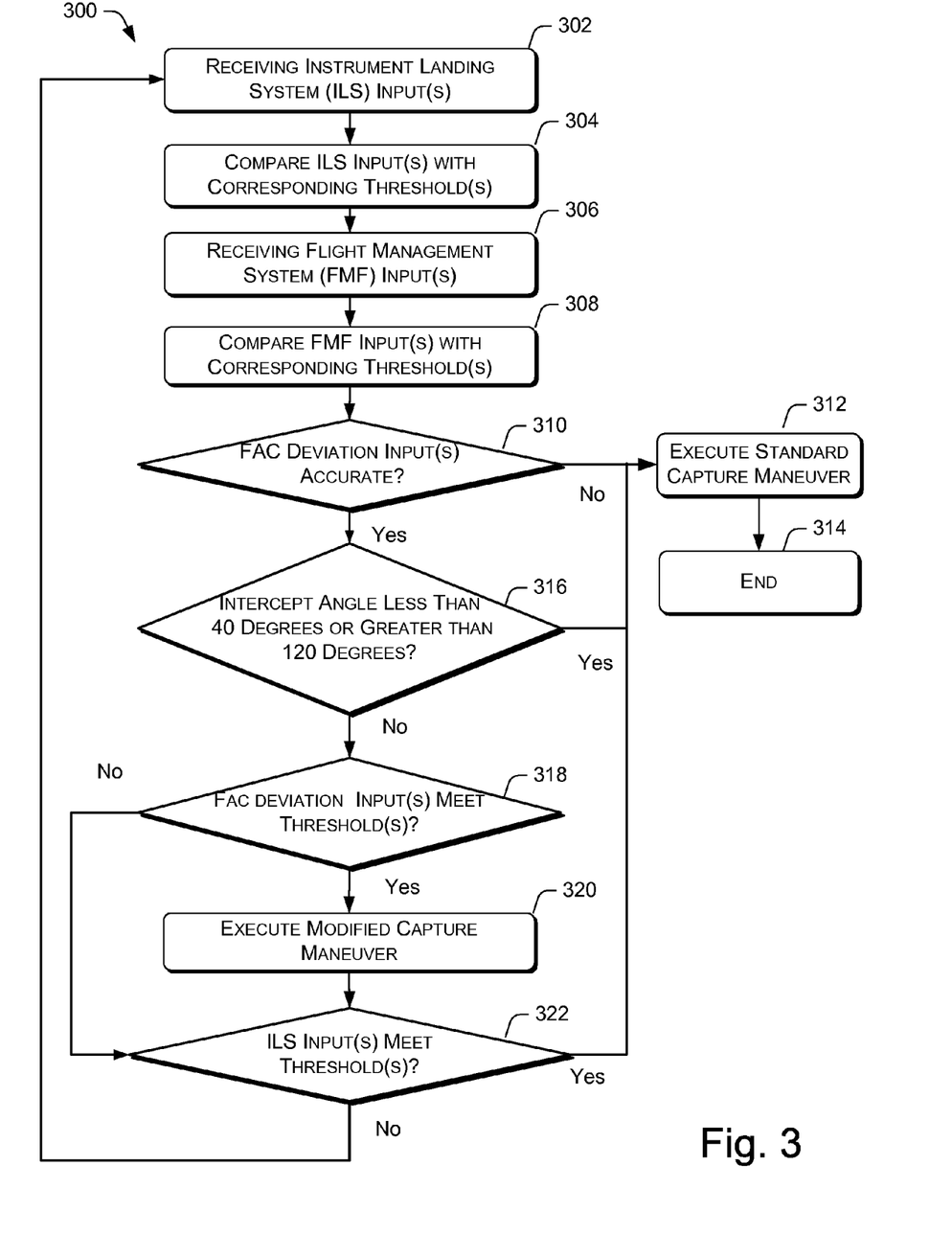
FIG. 3 is a flow diagram illustrating an exemplary process for performing localizer reposition s using the system shown in FIG. 2, in accordance with an embodiment of the invention.

FIG. 3 is a flow diagram illustrating an exemplary process 300 for performing localizer reposition s using the system 200 shown in FIG. 2, in accordance with an embodiment of the invention. The exemplary process 300 in FIG. 3 is illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to avionics system 200 of FIG. 2, although they may be implemented in other system architectures.

At block 302, an aircraft is in the general vicinity of a runway. At this time, the reposition maneuver computer 220 may employ the autopilot interface module 226 to receive the ILS localizer errors from the autopilot 204. The ILS localizer errors may include angular separation or estimated rectilinear deviations as calculated by the deviation calculator 206. At block 304, the comparison module 236 may compare the ILS localizer errors, such as the angular deviations, with the corresponding criteria stored in the database 240. As described above, in some embodiments, additional data used may include ground track angles, ground speed, and runway headings.

At block 306, the reposition maneuver computer 220 may employ the flight management function interface module 228 to receive FAC deviations from the navigation system 210. As described above, the FAC deviations may be calculated by the FMF 212.

At block 308, the comparison module 236 may continuously compare the FAC deviations with the corresponding FAC deviation thresholds stored in the database 240. In one particular implementation, blocks 306-308 may be performed simultaneously with blocks 302-304.

At decision block 310, the comparison module 236 may make a determination as to whether the navigation data, including FAC deviations, as obtained from the navigation system 210 are accurate. In one embodiment, the comparison module 236 may make this determination based on information from an aircraft FMS that is capable of estimating actual navigation performance (ANP).

If the comparison module 236 determines that the navigation data, including FAC deviations, are not accurate, ("no" at decision block 310), the comparison module 236 may direct the reposition maneuver module 232 to disable the "track-to-localizer" mode. Consequently, at block 312, the reposition maneuver module 232 may guide the aircraft to perform a standard localizer reposition when the ILS localizer errors reach their corresponding thresholds. Once the standard localizer reposition has been successfully performed and the aircraft centers on the runway 102, the process 300 may terminate at block 314. According to various embodiments, the reposition maneuver module 232 may direct the aircraft by executing the reposition maneuvers directly via the autopilot 204 or providing steering guidance to a pilot via the flight director 216.

However, if the comparison module 236 determines that the navigation data, include FAC deviation, are accurate, ("yes" at decision block 310), the process may continue to block 316. At decision block 316, the comparison module 236 may determine whether the aircraft is currently at an intercept angle to the runway heading that is within a desired range. For example, in some embodiments, the desired range is less than approximately 40 degrees or greater than approximately 120 degrees with respect to the runway. In one embodiment, the comparison module 236 may make this determination as the aircraft reaches the FAC deviation threshold 114. In this embodiment, if the comparison module 236 determines that the intercept angle is less than a lower limit (e.g. approximately 40 degrees) or greater than an upper limit (e.g. approximately 120 degrees), ("yes" at decision block 316), the comparison module 236 may direct the reposition maneuver module 232 to disable the "track-to-localizer" mode. Consequently, the process continues to block 312, where the reposition maneuver module 232 may direct the aircraft to perform a standard localizer reposition when the ILS localizer errors reach their corresponding threshold.

However, if the comparison module 236 determines that the intercept angle is between the lower limit and the upper limit, (e.g., equal to or greater than approximately 40 degrees, and equal to or less than approximately 120 degrees), ("no" at decision block 316), the comparison module may proceed to make a further determination at block 318.

At decision block 318, the comparison module 236 may determine whether the one or more FAC deviations are reaching their corresponding thresholds. If the FAC deviations reach their thresholds ("yes" at decision block 318), the comparison module 236 may direct the reposition maneuver module 232 to perform the modified reposition maneuver at block 320. Typically, the FAC deviations reach their corresponding thresholds prior to the ILS localizer errors reach their corresponding threshold. This is because FAC deviation thresholds 114 are generally positioned farther from the runway 102 than the ILS guidance sector boundaries 110.

However, if the FAC deviations do not reach their thresholds first ("no" at decision block 318), the process may continue to block 320. In one instance, this scenario may occur if the navigation system 210 fails to continuously provide FAC deviations.

At decision block 322, the comparison module 236 may determine whether the one or more ILS localizer errors are reaching their corresponding thresholds. In one embodiment, the comparison module 236 is carrying out this determination while a modified reposition maneuver is being executed. In another embodiment, the comparison module 236 is carrying out this determination while concurrently making a determination as to whether the one or more FAC deviations are reaching their corresponding thresholds (as described in decision block 318).

Regardless of the embodiment, if the comparison module 236 determines that the one or more ILS localizer errors reach their thresholds at decision block 322 ("yes" at decision block 322), the process continues at block 312. At block 312, the comparison module 236 may command the reposition maneuver module 232 to direct the aircraft to perform the standard reposition maneuver. Furthermore, if the comparison module 236 has previous commanded the performance of a modified reposition maneuver, the performance of the standard reposition maneuver may be appropriately tailored to transit the aircraft from the performance of the "track-to-localizer" mode. Finally, once the standard localizer reposition has been successfully performed and the aircraft centers on the runway, the process 300 may terminate at block 314.

Figure 4:
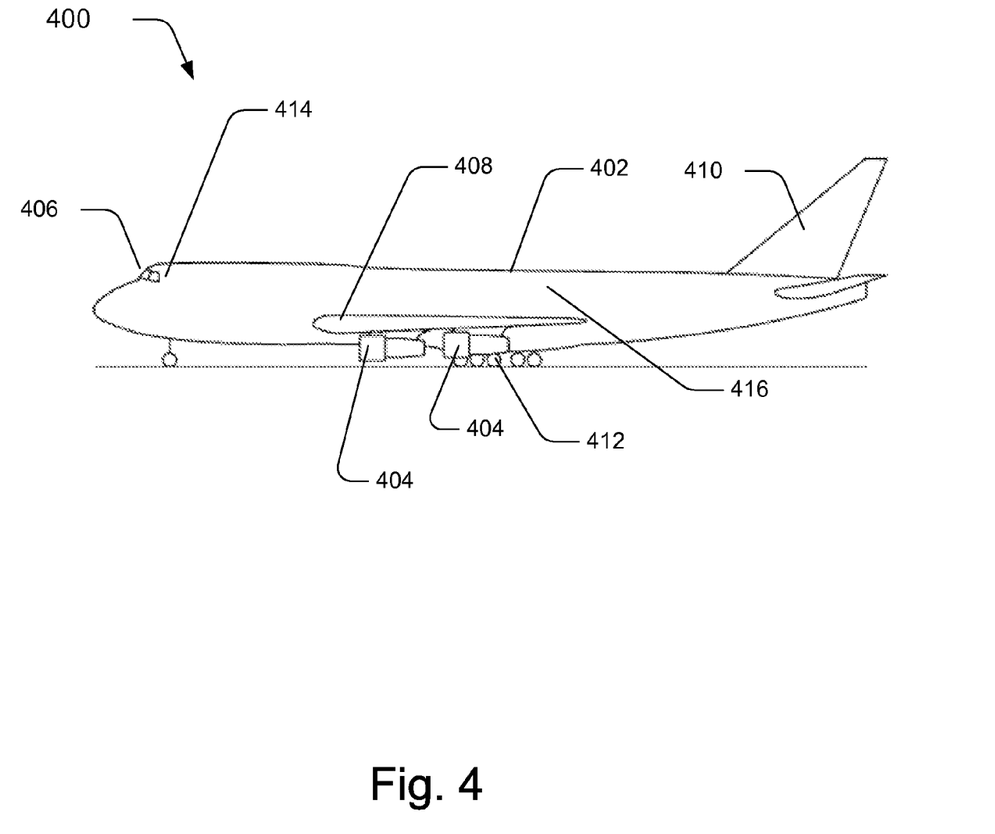
FIG. 4 is a side elevational view of an aircraft equipped with the reposition maneuver computer as illustrated in FIG. 2, in accordance with another embodiment of the invention.

FIG. 4 is a side elevation view of an aircraft 400 in accordance with an embodiment of the present invention. In general, except for one or more systems in accordance with the present invention, the various components and subsystems of the aircraft 400 may be of known construction and, for the sake of brevity, will not be described in detail herein. As shown in FIG. 4, the aircraft 400 includes one or more propulsion units 404 coupled to a fuselage 402, a cockpit 406 in the fuselage 402, wing assemblies 408 (or other lifting surfaces), a tail assembly 410, a landing assembly 412, a guidance and control system 416, and a host of other systems and subsystems that enable proper operation of the aircraft 400. In one embodiment, guidance and control system 416 includes avionic system 200. At least one component of a reposition maneuver computer 414 (220 in FIG. 2) formed in accordance with the present invention is located within guidance and control system 416 in the fuselage 402. However, components of the reposition maneuver component 414 may be distributed throughout the various portions of the aircraft 400.

Although the aircraft 400 shown in FIG. 4 is generally representative of a modern commercial passenger aircraft, the inventive apparatus and methods disclosed herein may also be employed in the assembly of virtually any other types of aircraft. More specifically, the teachings of the present invention may be applied to the manufacture and assembly of other passenger aircraft, cargo aircraft, rotary aircraft, and any other types of aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference. It may also be appreciated that alternate embodiments of system and methods in accordance with the present invention may be utilized in other aerial vehicles, both manned and unmanned.

Figure 5:
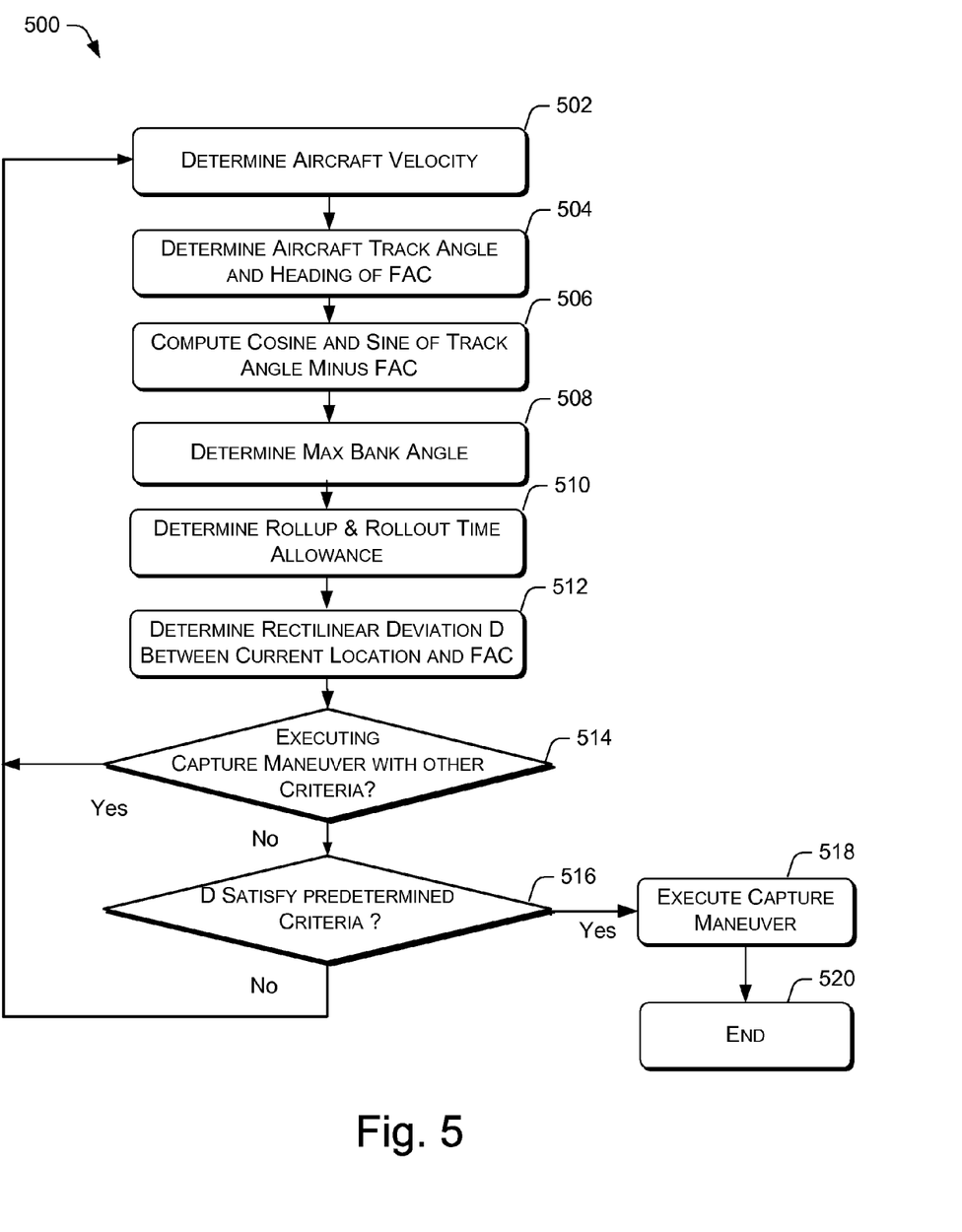
FIG. 5 is another flow diagram illustrating an exemplary process for determining a location at which the aircraft should begin its approach using the system shown in FIG. 2, in accordance with an embodiment of the invention.

FIG. 5 is a flow diagram illustrating an exemplary process 500 for performing localizer repositions using the system 200 shown in FIG. 2, in accordance with another embodiment of the invention. The exemplary process 500 in FIG. 5 is illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to the avionics system 200 of FIG. 2, although they may be implemented in other system architectures.

At block 502, an aircraft may be in the general vicinity of a runway, and at this time, the Instrument Landing computer (ILC) may employ the flight management interface module 228 to receive the aircraft velocity with respect to ground (designated as Vel_Gnd) from the from the navigation system 210 or instrument landing sensor 202. Further in block 504, the maneuver computer 220 may employ flight management function interface module 228 to receive the aircraft track angle and the FAC heading from navigation system 210. At block 506, the maneuver computer 220 may employ the flight management function (FMF) component to compute both the cosine of (the track angle minus the FAC heading) (hereby designated as Rwy_Trk_Dif_Cos), and the sine of (the track angle minus the FAC heading) (hereby designated as Rwy_Trk_Dif_Sin).

At block 508, the reposition maneuver computer 220 may employ the flight management function to receive a maximum bank angle of the aircraft permitted during a reposition maneuver (hereby designated as Phimax) from the flight path database 214 or database 240. In one embodiment, the maximum bank angle could be computed by the flight management function as a function of altitude and/or airspace. Such an angle may, in additional to being retrieved from a database, be provided by an operator of the aircraft via the flight director interface module 234. Computer 220, in block 510 retrieves from the database or an operator of the aircraft via the autopilot interface module 226 or flight director interface module 234, the rollup and rollout time allowance for the aircraft (hereby designated as Capt_Rup_KPg). In one implementation Capt_Rup_KPg may equal a predetermined value times Phimax divided by a nominal roll rate limit for the aircraft, where the predetermined value is determined from the maneuvering characteristics of the aircraft. In another implementation, the Capt_Rup_KPg equals two times Phimax divided by a nominal roll rate limit for the aircraft.

At block 512, the flight management computer 220 using deviation calculator 206 determines a rectilinear deviation D between the current aircraft location and the FAC of the aircraft. In one implementation, the current aircraft location may be determined using ILS 202 which may include a global positioning system or a global satellite landing system. In another embodiment, the location could be provided from other navigational aids or be extrapolated from a known location using inertial data. A determination is made, at block 514, by the flight management function 212 in reposition maneuver computer 220 whether the reposition maneuver is being executed by other reposition criteria, such as the reposition criteria described in FIG. 3. If the reposition maneuver is being executed by other criteria, the method 500 returns to block 502 and the aircraft velocity is again determined, and the above-described activities are repeated.

If no other reposition maneuvers are being executed, then at block 516, the comparison module 236 determines whether a rectilinear deviation D satisfies a predetermined criteria (or Rectilinear Engage Criteria). In a specific embodiment, the predetermined criteria may be satisfied when rectilinear deviation D is less than D1+D2, where D1=(Vel_Gnd)$^2$*(1−Rwy_Trk_Dif_Cos)/(G*tan (Phimax)) and D2=Vel_Gnd*Capt_Rup_KPg*Rwy_Trk_Dif_Sin, and where G is the universal gravitational acceleration constant. In other embodiments, other criteria may be suitably used. If the rectilinear deviation D does not satisfy the predetermined criteria at block 516, then the method 500 returns to block 502 and the above-described activities with respect to blocks 502-514 are repeated.

It may be appreciated that in some embodiments, the Rectilinear Engage Criteria can be applied without ILS or Consistent Localization Captures, such as when the aircraft is preparing to intercept a final approach path intending to use ILS localizer guidance, and FAC deviations are available. The criteria can also be used when the aircraft is preparing to intercept final approach path, intending to use GLS localizer guidance regardless of whether FAC deviations are available. In addition, the criteria can be used with the aircraft is preparing to intercept a final approach path, intending to use FAC deviations for guidance regardless of the availability of ILS localizer. Finally in another implementation the criteria can be used with the aircraft is preparing to intercept a great circle route from one waypoint to another and intending to use a lateral navigation mode.

Upon comparison module 236 determining that the criteria is satisfied, at block 518 reposition maneuver module 232 may guide the aircraft to perform a localizer reposition or any other type of reposition. Once the localizer reposition has been successfully performed and the aircraft centers on the runway 102 or the desired final defined flight path, the process 500 may terminate at block 520. In another implementation the process 500 can restart after executing the reposition maneuver 518 by re-executing blocks 502-520 to begin the reposition maneuver after each leg of the flight of the aircraft.

According to various embodiments, the reposition maneuver module 232 may direct the aircraft by executing the reposition maneuvers directly via the autopilot 204 or providing steering guidance to a pilot via the flight director 216. In one embodiment, the reposition maneuver may be commenced using a localization mode, by using a lateral navigation mode, or by commencing a turn under manual mode. If the criterion is not satisfied, the aircraft velocity is determined at block 502, the start of the reposition maneuver is delayed, and blocks 504-516 are repeated.

Embodiments of systems and methods in accordance with the present disclosure may provide significant advantages over the prior art. For example, with the ability to perform localizer reposition maneuvers from larger intercept angles and within closer proximity to the runway threshold, airlines may save fuel costs and time by reducing the length of the downwind leg. Currently, aircrafts generally fly downwind legs of sufficient length such that they can turn to their intercept heading yet have enough distance to the airfield to execute a shallow angle localizer reposition. Moreover, the reduction of overshoots by aircrafts may provide fuel cost and time savings, as the overshoots for some current localizer reposition s can be one mile or longer.

Additionally, embodiments and methods in accordance with the current disclosure may potentially help to ease air traffic congestion at airports that are equipped with parallel runways. This is due to the fact that reduction in localizer overshoots may allow air traffic controllers to more closely sequence aircraft that are concurrently using two parallel runways. The ability to execute repositions at larger intercept angles also may provide air traffic controllers additional freedom to sequence aircraft to converge on their final approach from a larger array of courses. This may reduce or eliminate the long lines of aircraft waiting to begin their reposition maneuvers from a common location.

While embodiments of the invention have been illustrated and described above, many changes can be made without departing from the spirit and scope of the invention. Accordingly, the scope of the invention is not limited by the disclosure of these embodiments. Instead, the invention should be determined entirely by reference to the claims that follow.

What is claimed is:

1. A method for guiding an aircraft, the method comprising:
   determining a rectilinear deviation D between a current aircraft location and a final defined path (FDP) of the aircraft;
   determining a location for the aircraft to begin a reposition maneuver based at least in part on the rectilinear deviation D and a relationship between the rectilinear deviation D and characteristics of the aircraft, the characteristics of the aircraft are selected from the group of characteristics comprising: a velocity of the aircraft with respect to ground (Vel_Gnd), an aircraft track angle, a heading of the FDP of the aircraft, a maximum allowed bank angle of the aircraft during a reposition maneuver (Phimax), and a time allowance for aircraft rollup and rollout (Capt_Rup_KPg); and
   starting the reposition maneuver of the aircraft at the location.

2. The method as recited in claim 1 wherein the characteristics of the aircraft is D1+D2, where D1=(Vel_Gnd)2*(1−Rwy_Trk_Dif_Cos)/(G*tan (Phimax)) and D2=Vel_Gnd*Capt_Rup_KPg*Rwy_Trk_Dif_Sin, where Rwy_Trk_Dif_Cos is a cosine of (a determined aircraft track angle minus a determined FAC heading), where Rwy_Trk_Dif_Sin is a sine of (the determined aircraft track angle minus the determined aircraft FDP heading) and where G is the universal gravitational acceleration constant.

3. The method as recited in claim 2, wherein the reposition maneuver is started when the magnitude of D is less than the magnitude of the sum of D1 and D2.

4. The method of claim 2, wherein the FDP is a centerline of an airport runway.

5. The method of claim 2, further comprising determining the current aircraft location using indications from a GPS system, using extrapolation from a known location using inertial data, and using a Global Satellite Landing system.

6. The method of claim 2, further comprising conducting the reposition maneuver by using a localization mode, by using a lateral navigation mode, or by commencing a turn under manual mode, and delaying a start of the reposition maneuver of the aircraft until the predetermined relationship exists between deviation D and the sum of D1 and D2.

7. The method as recited in claim 1, further comprising triggering a determination of a location at which the aircraft should begin the reposition maneuver after each leg of a flight of the aircraft.

8. The method as recited in claim 2 wherein Capt_Rup_KPg equals a predetermined value times Phimax divided by a nominal roll rate limit for the aircraft, where the predetermined value is determined from one or more maneuvering characteristics of the aircraft.

9. A computer readable medium having computer-executable instructions that, when executed, perform a method comprising:
   determining a velocity of an aircraft with respect to ground (Vel_Gnd);
   determining a track angle and a heading of a final defined path (FDP) of the aircraft;
   computing a cosine of (the determined aircraft track angle minus the determined FDP heading) (Rwy_Trk_Dif_Cos) and a sine of (the determined aircraft track angle minus a determined aircraft FDP heading) (Rwy_Trk_Dif_Sin);
   determining a maximum allowed bank angle of the aircraft during a reposition maneuver (Phimax);
   determining a time allowance for aircraft rollup and rollout (Capt_Rup_KPg);
   determining a rectilinear deviation D between a current aircraft location and the FDP of the aircraft; and
   starting a reposition maneuver of the aircraft based on a relationship between the rectilinear deviation D and a predetermined criteria based on at least one of the velocity of the aircraft with respect to the ground (Vel_Gnd), the heading of the final defined path, the angle Rwy_Trk_Dif_Cos, the angle RWY_Trk_Dif_Sin, and the time allowance Capt_Rup_KPg.

10. The computer readable medium as recited in claim 9 wherein the predetermined criteria is based on a sum of D1 and D2, where D1=(Vel_Gnd)2*(1−Rwy_Trk_Dif_Cos)/(G*tan (Phimax)) and D2=Vel_Gnd*Capt_Rup_KPg*Rwy_Trk_Dif_Sin, and where G is the universal gravitational acceleration constant, and wherein the reposition maneuver is started when the rectilinear deviation D is less than the sum of D1 plus D2.

11. The computer readable medium as recited in claim 10 further comprising delaying of starting using localization mode, using a lateral navigation mode, or commencing a turn under manual mode, until the reposition maneuver of the aircraft is based on the relationship between deviation D and D1+D2.

12. The computer readable medium as recited in claim 10 further comprising triggering a determination of the relationship between D and D1+D2 to determine the start of the reposition maneuver after completing each leg of the flight of the aircraft.

13. The computer readable medium as recited in claim 9 wherein Capt_Rup_KPg equals a predetermined value times Phimax divided by a nominal roll rate limit for the aircraft, where the predetermined value is determined from the maneuvering characteristics of the aircraft.

14. An aircraft comprising:
   a fuselage and
   at least one avionic system for guiding the aircraft and at least partially disposed within the fuselage, the avionic system comprising:
      a flight management function (FMF) component, said FMF component configured to receive at least one of a velocity of an aircraft with respect to ground (Vel_Gnd), an aircraft track angle, a heading of a final defined path (FDP) for the aircraft, a maximum allowed bank angle of the aircraft during a reposition maneuver (Phimax), or a current location of the aircraft and a time allowance for aircraft rollup and rollout (Capt_Rup_KPg); and
      a reposition maneuver computer configured to compute a rectilinear deviation D between a current aircraft location and a final defined path (FDP) of the aircraft, and to initiate a reposition maneuver of the aircraft based on a relationship between the rectilinear deviation D and a predetermined criteria, the predetermined criteria being based on at least one of the velocity of the aircraft with respect to the ground (Vel_Gnd), the heading of the FDP, or the time allowance Capt_Rup_KPg.

15. The aircraft of claim 14, wherein the reposition maneuver computer is further configured to compute:
- a cosine of (the determined aircraft track angle minus the determined FDP heading) (Rwy_Trk_Dif_Cos); and
- a sine of (the determined aircraft track angle minus the determined aircraft FDP heading) (Rwy_Trk_Dif_Sin),
- wherein the reposition maneuver computer is configured to indicate initiation of a reposition maneuver based on a relationship between rectilinear deviation D and the sum of D1 and D2, where D1=(Vel_Gnd)2*(1−Rwy_Trk_Dif_Cos)/(G*tan (Phimax)) and D2=Vel_Gnd*Capt_Rup_KPg*Rwy_Trk_Dif_Sin, and where G is the universal gravitational acceleration constant.

16. The aircraft of claim 15, wherein the reposition maneuver computer is initiated when a magnitude of D is less than a magnitude of the sum of D1 and D2, and the FDP is a centerline of an airport runway.

17. The aircraft of claim 14, wherein the flight management function component determines the current aircraft location using indications from at least one of a GPS system, an extrapolation from a known location using inertial data, a very high frequency omni-directional range (VOR) or distance measurement equipment (DME) navigation aid, and a Global Satellite Landing system.

18. The aircraft of claim 15, wherein the reposition maneuver computer delays starting using a localization mode, using a lateral navigation mode, or commencing a turn under manual mode, if the reposition maneuver computer of the aircraft is based on the relationship between deviation a magnitude of D and a sum of D1 and D2.

19. The aircraft of claim 14, wherein the FMF component initiates the reposition maneuver computer after completing one leg of a flight path of the aircraft and before initiating another leg.

* * * * *